United States Patent Office 3,551,485
Patented Dec. 29, 1970

3,551,485
PRODUCTION OF BIS-(4-AMINOCYCLOHEXYL)-ALKANES
Paul Raff, Ludwigshafen (Rhine), Hans Georg Peine, Frankenthal, Pfalz, and Ludwig Schuster and Karl Adam, Ludwigshafen (Rhine), Germany, assignors to Badische Anilin- & Soda-Fabrik Aktiengesellschaft, Ludwigshafen, Germany
No Drawing. Filed Sept. 12, 1967, Ser. No. 667,092
Claims priority, application Germany, Sept. 17, 1966, B 88,963
Int. Cl. C07c 85/06
U.S. Cl. 260—563    8 Claims

ABSTRACT OF THE DISCLOSURE

Production of bis-(4-aminocyclohexyl)-alkanes by reaction of bis-(4-hydroxycyclohexyl)-alkanes with ammonia in the presence of hydrogen and hydrogenation catalysts at elevated temperature and at superatmospheric pressure in liquid phase, hydrogenation catalysts being used which contain 90 to 99% by weight of cobalt, 1 to 10% by weight of manganese and 0.5 to 10% by weight of phosphoric acid. Bis-(4-aminocyclohexyl)-alkanes are suitable for the production of polyamides.

---

This invention relates to an improved process for the production of bis-(4-aminocyclohexyl)-alkanes by reaction of bis-(4-hydroxycyclohexyl)-alkanes with ammonia.

It is known from British patent specification No. 1,019,929 that bis-(4-aminocyclohexyl)-alkanes are obtained by reaction of bis-(4-hydroxycyclohexyl)-alkanes with ammonia in the presence of hydrogenation catalysts. This method has the disadvantage that it is only at relatively high temperatures of 250° to 300° C. that good yields are obtained. At these high temperatures however numerous secondary reactions take place so that the diamine obtained is contaminated. If the diamine is to be used for the production of polymers, high purity requirements are placed on it. It is therefore necessary to purify (at great expense) the diamine prepared by the said method. It has also already been proposed to use catalysts which contain cobalt and manganese and have a content of pyroacids or polyacids for aminating alcohols.

It is an object of the invention to provide an improved process by which bis-(4-aminocyclohexyl)-alkanes are obtained in high yields at lower temperatures than hitherto. It is a further object of the invention to provide an improved process by which bis-(4-aminocyclohexyl)-alkanes are obtained in high purity.

In accordance with this invention these and other objects and advantages are achieved in an improved process for the production of bis-(4-aminocyclohexyl)-alkanes by reaction of bis-(4-hydroxycyclohexyl)-alkanes with ammonia in the presence of hydrogen and hydrogenation catalysts at elevated temperature and superatmospheric pressure in liquid phase by using hydrogenation catalysts containing cobalt and manganese and also phosphoric acid.

The new process has the advantage that it gives high yields at much lower temperatures than hitherto and that particularly pure products are obtained which are eminently suitable for the production of polymers.

Preferred bis-(4-hydroxycyclohexyl)-alkanes have the general formula:

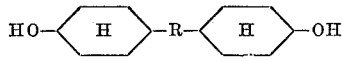

in which R denotes an alkylene radical having one to four carbon atoms or an alkylidene radical having one to four carbon atoms. Examples of suitable compounds are: bis-(4-hydroxycyclohexyl)-methane, bis-(4-hydroxycyclohexyl)-propane-(1,3), bis - (4 - hydroxyclclohexyl)-butane-(1), bis-(4-hydroxycyclohexyl) - propane - (2,2), and bis-(4-hydroxycyclohexyl)-butane-(1,1), bis-(4 - hydroxycyclohexyl)-propane-(2,2) having particular industrial importance.

The bis-(4-hydroxycyclohexyl)-alkane and ammonia are generally used in the molar ratio 1:2 to 1:20, preferably 1:3 to 1:6. The reaction is carried out in the presence of hydrogen. It is advantageous to use hydrogen partial pressures of from 10 to 50 atmospheres gauge, preferably 50 to 100 atmospheres gauge. The reaction may be advantageously carried out at a temperature of from 150° to 200° C. Particularly good results are obtained by using temperatures of from 160° to 190° C. The pressures used in the reaction are in general 100 to 400 atmospheres gauge, preferably 250 to 350 atmospheres gauge. The pressure and temperature are correlated so that the bis-(4-hydroxycyclohexyl)-alkane and part of the ammonia are present in liquid phase.

The hydrogenation catalysts contain cobalt and manganese. Advantageously they contain 90 to 99% by weight of cobalt and 1 to 10% by weight of manganese, preferably 93 to 97% by weight of cobalt and 3 to 7% by weight of manganese with reference to the total metal content. The catalysts also contain phosphoric acid. The content of phosphoric acid is advantageously from 0.5 to 10% by weight, preferably from 1 to 5% by weight, with reference to the total metal content. All percentages relate to the analytically determined contents of the individual components, the metals being given as such and the phosphoric acid as anhydride, irrespective of their actual condition of combination. The phosphoric acid may be present in the finished catalyst for example as such or as a pyroacid or polyacid in free form and/or in the form of at least one salt of the said metals. The catalyst may be used unsupported, i.e. without a carrier; in this case the individual components of the catalyst are heated in the form of compounds which are capable of being reduced at elevated temperature with hydrogen, such as oxides, hydroxides, oxalates, ammoniates or formates, with an addition of the specified amount of phosphoric acid mixture, preferably to 300° to 700° C. and then reduced with hydrogen, advantageously at 200° to 350° C. In a preferred method for the production of the catalysts, the metal salts and phosphoric acid are precipitated together from a solution by means of sodium carbonate and the precipitate is heated, for example in a muffle furnace, at about 300° to 700° C. The mixture is then powdered and pressed into pellets or extrusions and then reduced with hydrogen as described. It is also possible to apply the metal salts and the phosphoric acid to a carrier, such as fuller's earth, silicic acid, silica gel, aluminum oxide or silicates, to heat them as described, for example at about 300° to 700° C., and then to reduce them with hydrogen. It has proved to be advantageous to precipitate the metal components together with the phosphoric acid onto a powdered carrier, or to effect coprecipitation with the carrier from a solution, for example with sodium carbonate, to heat the precipitate to about 300° to 700° C. and then to reduce the product with hydrogen as described. It is advantageous to remove water formed during the reaction periodically, for example by releasing the pressure on the reaction mixture, or continuously, for example by condensation from the recycle reaction gas.

The process according to this invention is carried out for example by metering the bis-(4-hydroxycyclohexyl)-alkane, ammonia and hydrogen in the specified ratio into a high-pressure reactor containing the said catalyst and allowing reaction to take place under the specified temperature and pressure conditions. Water formed during the reaction is advantageously removed during the reaction, for example by releasing the pressure on the reaction mixture. In commercial operation it is advantageous to use a continuous method by charging a vertical high-pressure tube with the catalyst, metering bis-(4-hydroxycyclohexyl)-alkane in at the top and at the same time metering in hydrogen and ammonia countercurrent or cocurrent under the specified conditions. In a particularly advantageous continuous method, about half to ten times the weight, preferably once to five times the weight of reaction mixture (with reference to the bis-(4-hydroxycyclohexyl)-alkane used) is fed in at the top of the high-pressure tube together with the bis-(4-hydroxycyclohexyl)-alkane. Hydrogen and ammonia separated from the mixture is advantageously freed from water, for example by condensation, and returned to the reaction. Pure diamines are obtained from the crude reaction mixture by fractional distillation.

Bis-(4-aminocyclohexyl)-alkanes prepared by the process according to this invention are suitable for the production of polyamides (cf. U.S. Pat. No. 2,606,924).

The invention is further illustrated by the following examples in which parts specified are parts by weight unless stated otherwise. Parts by weight bear the same relation to parts by volume as the gram to the liter.

EXAMPLE 1

1500 parts of bis-(4-hydroxycyclohexyl)-propane-(2,2) and 300 parts of a catalyst (containing 91% by weight of cobalt, 5.5% by weight of manganese (based on the metal content) and 3.5% by weight of phosphoric acid) are placed in an autoclave having a capacity of 8 parts by volume. Hydrogen is then forced in until the pressure reaches 50 atmospheres. Then 3000 parts of ammonia is metered into the autoclave. The reaction mixture is heated for ten hours at 170° C. and then ammonia and hydrogen and the water of reaction formed are removed by releasing the pressure. To complete the reaction, hydrogen is again forced in until the pressure reaches 50 atmospheres and then 3000 parts of ammonia is metered in. The whole is then heated again to 170° C. for another ten hours. The reaction mixture is allowed to cool, released from pressure and dissolved in 1 part by volume of ethanol. Catalyst is filtered off from the resultant suspension and the alcohol is distilled off from the filtrate. The residue is distilled at a pressure of 0.1 mm. 1470 parts of bis-(4-aminocyclohexyl)-propane-(2,2) is obtained which has an amine number of 442 (theory 471). The yield is 92.7% of the theory.

EXAMPLE 2

The procedure of Example 1 is followed but at a reaction temperature of 190° C. 1400 parts (86.3% of the theory) of bis-(4-aminocyclohexyl)-propane-(2,2) is obtained having an amine number of 433 (theory 471).

We claim:

1. A process for the production of bis-(4-aminocyclohexyl)-alkanes having the formula:

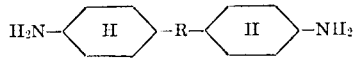

in which R denotes an alkylene radical having one to four carbon atoms or an alkylidene radical having one to four carbon atoms by reaction of the corresponding bis-(4-hydroxycyclohexyl)-alkane with ammonia in a molar ratio of from 1:2 to 1:20 at a hydrogen partial pressure of 10 to 150 atmospheres in the presence of hydrogenation catalysts at temperatures of from 150° to 200° C. and pressures of from 100 to 400 atmospheres in the liquid phase, wherein the hydrogenation catalyst contains 90 to 99% by weight of cobalt and 1 to 10% by weight of manganese, with reference to the total metal content, and also 0.5 to 10% by weight of phosphoric acid with reference to the total metal content.

2. A process as claimed in claim 1 wherein bis-(4-hydroxycyclohexyl)-propane-(2,2) is used as the starting material.

3. A process as claimed in claim 1 wherein the bis-(4-hydroxycyclohexyl)-alkane and ammonia are used in the molar ratio 1:3 to 1:6.

4. A process as claimed in claim 1 wherein a hydrogen partial pressure of 50 to 100 atmospheres is maintained.

5. A process as claimed in claim 1 wherein a temperature of from 160° to 190° C. is maintained.

6. A process as claimed in claim 1 wherein a pressure of 250 to 350 atmospheres is maintained.

7. A process as claimed in claim 1 wherein a catalyst is used which contains 93 to 97% by weight of cobalt and 3 to 7% by weight of manganese with reference to the total metal content.

8. A process as claimed in claim 1 wherein a catalyst is used which contains 1 to 5% by weight of phosphoric acid with reference to the total metal content.

References Cited

UNITED STATES PATENTS 2,113,241    4/1938    Punnett _____ 260—563X

FOREIGN PATENTS 1,019,929    2/1966    Great Britain _____ 260—563

CHARLES B. PARKER, Primary Examiner

D. R. PHILLIPS, Assistant Examiner